US012017459B2

(12) United States Patent
Karasawa et al.

(10) Patent No.: US 12,017,459 B2
(45) Date of Patent: Jun. 25, 2024

(54) LIQUID CONTAINER

(71) Applicant: SEIKO EPSON CORPORATION, Tokyo (JP)

(72) Inventors: Masahiro Karasawa, Matsumoto (JP); Naoki Naito, Ikeda-machi (JP); Yuji Aoki, Hara-mura (JP); Kazuyuki Hirata, Matsumoto (JP); Kiyoteru Katsuki, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 85 days.

(21) Appl. No.: 17/864,964

(22) Filed: Jul. 14, 2022

(65) Prior Publication Data

US 2023/0018269 A1 Jan. 19, 2023

(30) Foreign Application Priority Data

Jul. 15, 2021 (JP) ................................ 2021-117029

(51) Int. Cl.
*B41J 2/175* (2006.01)

(52) U.S. Cl.
CPC ......... *B41J 2/1752* (2013.01); *B41J 2/17509* (2013.01); *B41J 2/17513* (2013.01); *B41J 2/17523* (2013.01); *B41J 2/17553* (2013.01)

(58) Field of Classification Search
CPC .. B41J 2/1752; B41J 2/17509; B41J 2/17513; B41J 2/17523; B41J 2/17553; B41J 2/17526; B41J 2/17503; B41J 2002/17516
See application file for complete search history.

(56) References Cited

U.S. PATENT DOCUMENTS 10,232,627 B2 3/2019 Toya et al.
2013/0182050 A1* 7/2013 Aoki .................... B41J 2/17523
347/86

FOREIGN PATENT DOCUMENTS

JP 2018-065374 A 4/2018

* cited by examiner

*Primary Examiner* — Geoffrey S Mruk
(74) *Attorney, Agent, or Firm* — Oliff PLC

(57) ABSTRACT

Provided is a liquid container configured to be detachably attached to a printer body. The liquid container includes a liquid containing portion, a supplying passage member, and an adapter. The liquid containing portion is a portion for containing liquid. The supplying passage member has a supplying passage in liquid communication with the liquid containing portion, the liquid contained in the liquid containing portion being supplied toward the printer body through the supplying passage. The adapter is mounted on the supplying passage member and configured to couple the supplying passage to the printer body. The adapter and the supplying passage member are joined by snap fitting.

8 Claims, 15 Drawing Sheets

LIQUID CONTAINER

The present application is based on, and claims priority from JP Application Serial Number 2021-117029, filed Jul. 15, 2021, the disclosure of which is hereby incorporated by reference herein in its entirety.

BACKGROUND

1. Technical Field

Embodiments of the present disclosure relate to a liquid container.

2. Related Art

As disclosed in JP-A-2018-065374, a liquid container that includes a liquid containing portion having flexibility and containing liquid inside and a connection member mounted on the liquid containing portion is known.

These days, to reduce burdens on the environment, a reduction in the material of the connection member, etc. is demanded.

SUMMARY

A liquid container according to a certain aspect of the present disclosure is configured to be detachably attached to a printer body and includes a liquid containing portion for containing liquid; a supplying passage member having a supplying passage in liquid communication with the liquid containing portion, the liquid contained in the liquid containing portion being supplied toward the printer body through the supplying passage; and an adapter mounted on the supplying passage member and configured to couple the supplying passage to the printer body, wherein the adapter and the supplying passage member are joined by snap fitting.

DESCRIPTION OF EXEMPLARY EMBODIMENTS

Figure 1:
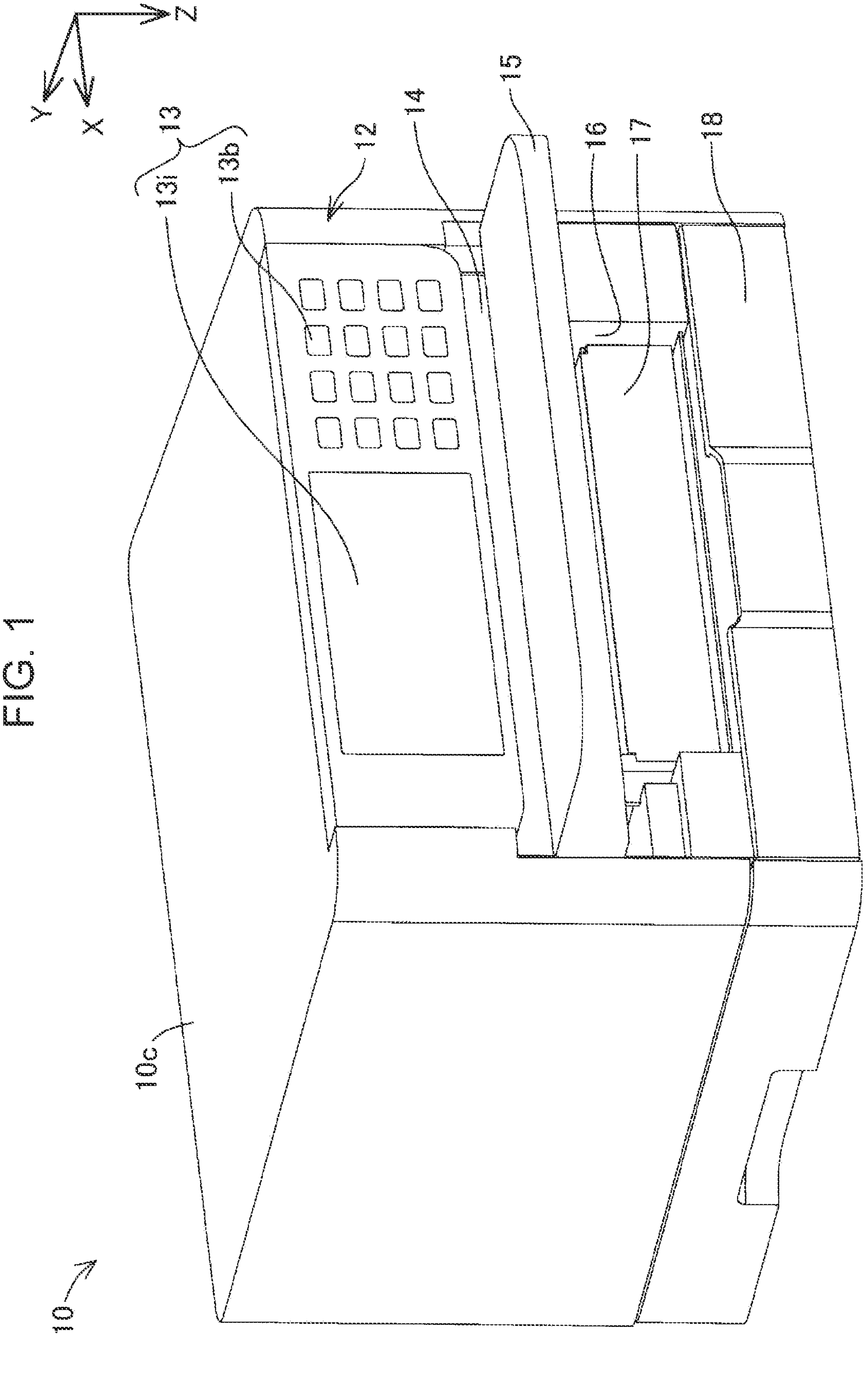
FIG. 1 is an external perspective view illustrating the structure of a printer.

First, the structure of a printer 10 will now be explained. In FIG. 1, three axes orthogonal to one another (X axis, Y axis, and Z axis) are illustrated. The direction along the Z axis is parallel to the direction of gravity. The +Z direction represents the direction of gravity. The −Z direction represents the direction that is the opposite of the direction of gravity. The direction along the Z axis is the vertical direction (height direction) of the printer 10. The direction along the Y axis is the front-rear direction (depth direction) of the printer 10. The direction along the X axis is the horizontal direction (width direction) of the printer 10.

The printer 10 according to the present embodiment is an ink-jet printer. The printer 10 consumes liquid, for example, ink, by ejecting it. The ink may be, for example, pigment ink. The printer ejects ink droplets to form an image on a medium MP, which is the target, by recording ink dots thereon. An example of the medium MP is paper. The printer 10 includes a hollow box-like housing 10*c* made of resin and constituting the armoring exterior of the printer 10. The housing 10*c* has a shape of substantially rectangular parallelepiped. An operation unit 13, a medium ejection port 14, a medium receiving portion 15, a medium accommodating port 16, a medium accommodating portion 17, and a cover member 18 are provided on a front portion 12, which is located on the −Y-directional side, of the housing 10*c*.

The operation unit 13 includes a display portion 13*i* for displaying information to a user and a plurality of buttons 13*b* for receiving an operation from the user. The medium ejection port 14 is an exit through which the medium MP that is being ejected goes out from the inside of the printer 10. The medium ejection port 14 has a shape of a wide slit-like opening extending in the direction along the X axis. The medium receiving portion 15 is an overhang protruding in the −Y direction under the medium ejection port 14. The medium receiving portion 15 receives the medium MP ejected through the medium ejection port 14.

The medium accommodating port 16 is an opening through which the user can put the medium MP for replenishment into the printer 10. In the present embodiment, the medium accommodating port 16 has a substantially rectangular opening that is wider in the direction along the X axis under the medium receiving portion 15. The medium accommodating portion 17 is a tray-like member in which the medium MP can be contained. The medium accommodating portion 17 is housed in the medium accommodating port 16 in a state in which the front face of the medium accommodating portion 17 can be seen from the outside of the printer 10 via the medium accommodating port 16. The user draws the medium accommodating portion 17 in the −Y direction out of the printer 10 through the medium accommodating port 16, puts the medium into the medium accommodating portion 17, and then puts the medium accommodating portion 17 that was drawn out through the medium accommodating port 16 back into the medium accommodating port 16. The user is able to load the medium MP for replenishment into the printer 10 by performing this series of operations.

The cover member 18 is a plate-like member made of resin and constituting a part of the armoring exterior of the printer 10. In the present embodiment, the cover member 18 has a substantially rectangular shape that is wider in the direction along the X axis, and is disposed under the medium accommodating port 16. The cover member 18 has nails (not illustrated) on its periphery. The cover member 18 is detachably attached to the housing 10*c*. The cover member 18 covers and protects a plurality of liquid containers 100 housed inside the printer 10.

Figure 2:
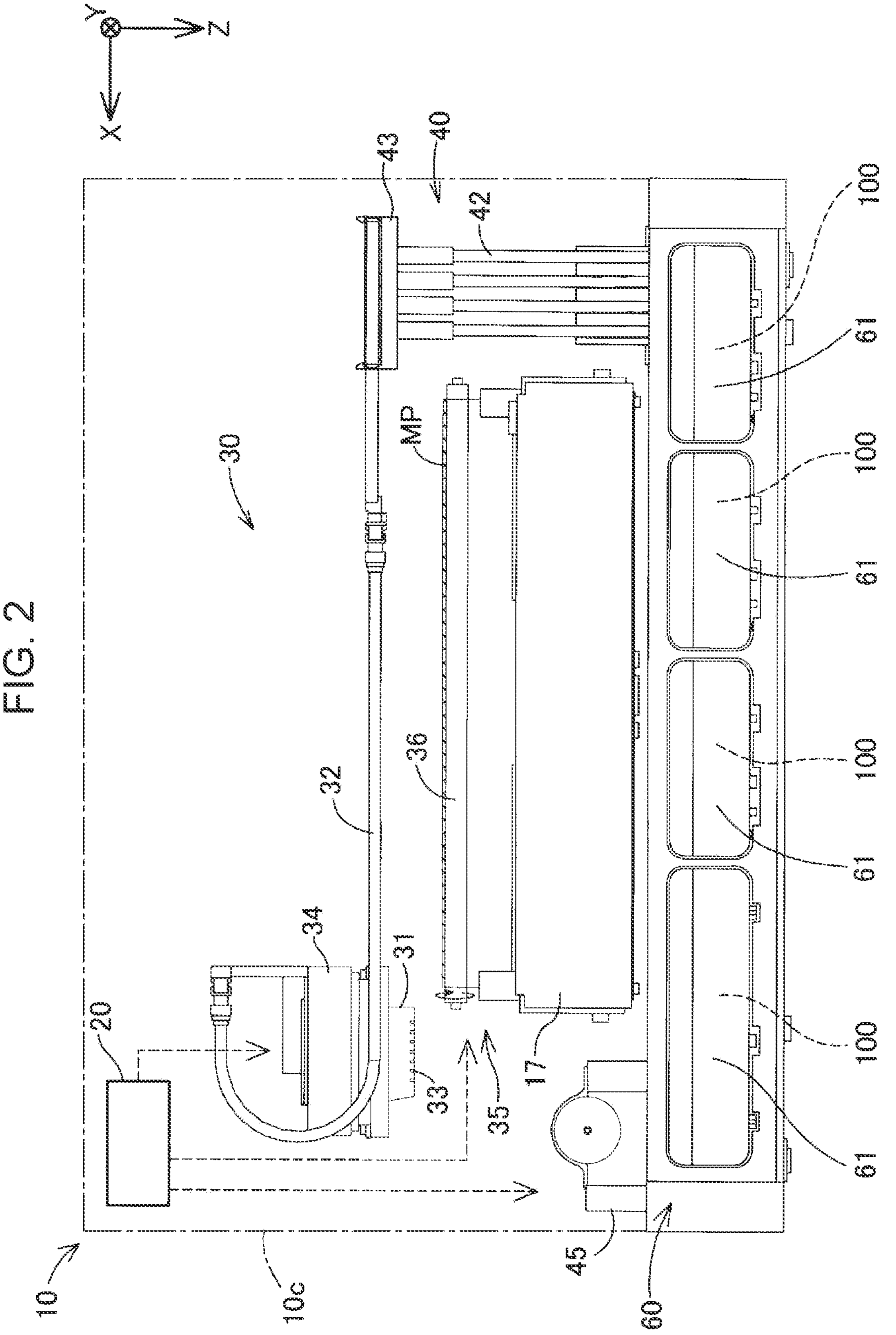
FIG. 2 is a schematic view illustrating the internal structure of the printer.
Figure 3:
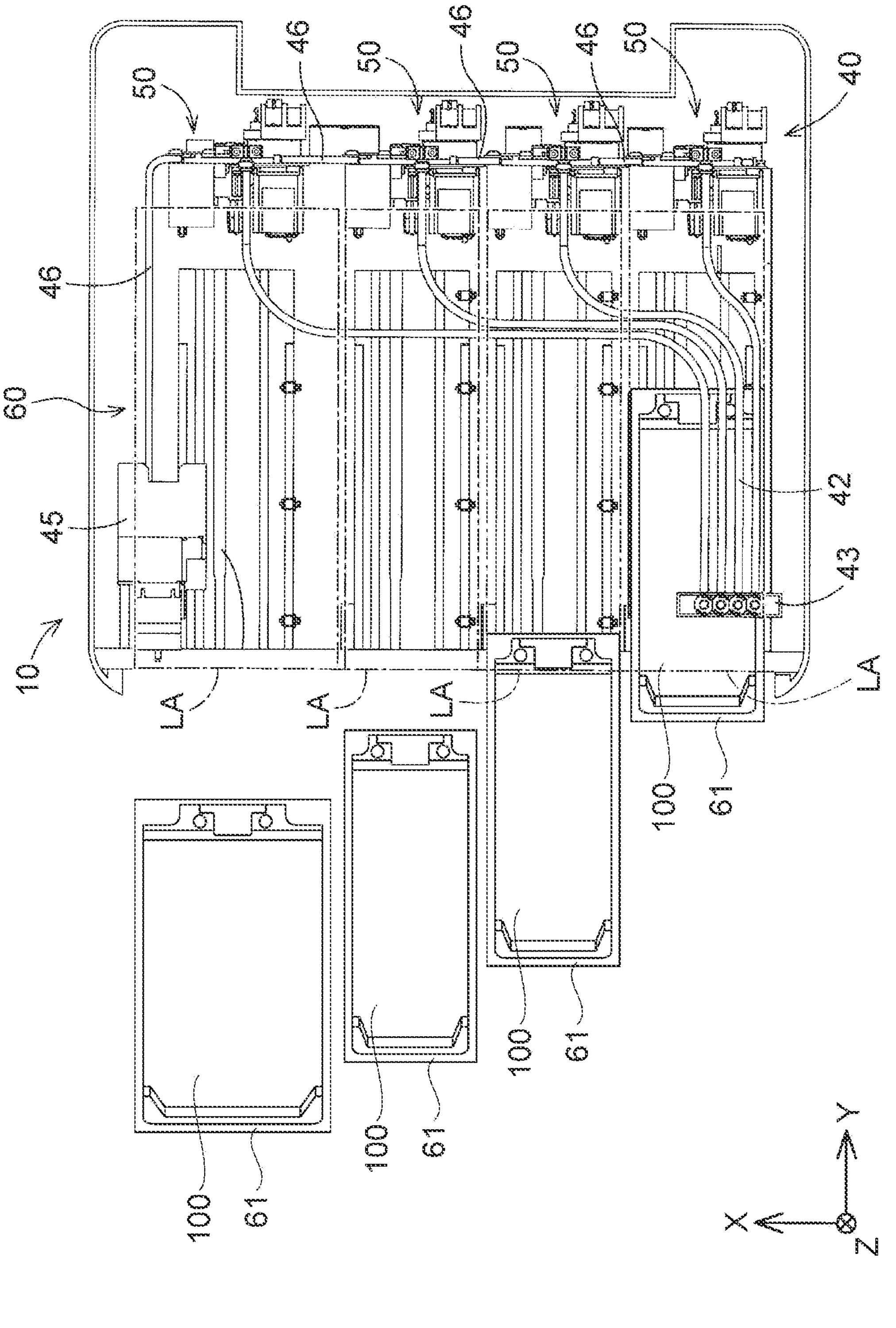
FIG. 3 is a schematic view illustrating the internal structure of the printer.

As illustrated in FIG. 2, the printer 10 includes a control unit 20, an ejection execution unit 30, a medium transportation unit 35, a liquid supplying unit 40, and a case accommodating portion 60. FIG. 3 is a schematic view, viewed in the +Z direction, of the printer 10, with the housing 10*c* and the cover member 18 removed. In FIG. 3, illustration of the ejection execution unit 30 and the medium transportation unit 35 is omitted. To facilitate the readers' understanding, FIG. 3 depicts a state in which each of the plurality of liquid containers 100 has been drawn out in the −Y direction together with the corresponding one of cases 61 from a layout area LA, which is a mount position at which mounting into the printer 10 has been completed.

In the printer 10, liquid is supplied to the ejection execution unit 30 through supply tubes 42 of the liquid supplying unit 40 from the liquid containers 100 housed in the case accommodating portion 60. Then, the ejection execution unit 30 ejects liquid onto the medium MP picked up from the medium accommodating portion 17 and transported by the medium transportation unit 35. By this means, a print image is formed on the medium MP.

The control unit 20 controls the operation of each component in the printer 10. The control unit 20 is a microcomputer that includes at least a central processor and a main storage. The central processor loads various kinds of program into the main storage and runs the loaded programs, thereby carrying out various functions.

The ejection execution unit 30 includes a head portion 31 and a plurality of tubes 32. The head portion 31 receives supply of liquid from the liquid supplying unit 40 through the plurality of tubes 32. The head portion 31 has liquid compartments for containing the liquid supplied from the liquid supplying unit 40. Nozzles 33 that are downward openings are provided in the bottom of the liquid compartments. Being controlled by the control unit 20, the head portion 31 ejects the liquid out of the liquid compartments from the nozzles 33 by, for example, applying pressure to the ink by piezoelectric elements.

The head portion 31 is mounted on a carriage 34 and reciprocates linearly in the direction along the X axis. The ejection execution unit 30 includes, as a driving mechanism for moving the head portion 31, a guide rod along which the carriage 34 moves, a motor that generates a driving force, and pulleys for transmitting the driving force.

The plurality of tubes 32 connected to the head portion 31 has flexibility. These tubes 32 are arranged next to one another in the direction along the Y axis. These tubes 32 are connected to the head portion 31 from a coupling portion 43, which is a portion for connection to the supply tubes 42 of the liquid supplying unit 40.

The medium transportation unit 35 transports the medium MP. The medium transportation unit 35 includes a transportation roller 36 provided in the direction along the X axis under the head portion 31. The medium accommodating portion 17 is disposed under the transportation roller 36. The medium transportation unit 35 has a feeding mechanism configured to feed the medium MP, one sheet after another, onto the outer circumferential surface of the transportation roller 36 from the medium accommodating portion 17. The medium transportation unit 35 causes a driving motor to rotate the transportation roller 36 and causes the medium MP to be moved in the −Y direction under the head portion 31 by this rotational driving force. In the present embodiment, the sub-scanning direction of the printer 10 agrees with the −Y direction. The medium MP having passed through the area under the head portion 31 is ejected through the medium ejection port 14 to the outside of the printer 10.

During the execution of print processing by the printer 10, the control unit 20 causes the medium transportation unit 35 to move the medium MP in the sub-scanning direction mentioned above. The control unit 20 causes the head portion 31 to reciprocate in the main-scanning direction (the direction along the X axis) along the transportation roller 36 in a space over the transportation roller 36 and causes the head portion 31 to eject ink droplets toward the print target surface of the medium MP at a point in time that is determined based on print data. By this means, ink dots are recorded on the medium MP at a position determined based on the print data, and an image that is based on the print data is formed.

As illustrated in FIG. 3, in addition to the plurality of supply tubes 42 and the coupling portion 43 described above, the liquid supplying unit 40 includes a plurality of connection receivers 50, a fluctuating pressure generation unit 45, and a pressure transmission tube 46.

The liquid supplying unit 40 is coupled to each of the plurality of liquid containers 100 housed in the case accommodating portion 60 via the corresponding one of the plurality of connection receivers 50. The liquid container 100 is detachably attachable to the body of the printer 10. In the printer 10 according to the present embodiment, four liquid containers 100 for respective ink colors are mounted. Therefore, in the present embodiment, the liquid supplying unit 40 includes four connection receivers 50 corresponding respectively to these four liquid containers 100. The plurality of connection receivers 50 is provided at a +Y-side end region of the case accommodating portion 60. Each of the plurality of connection receivers 50 is provided in such a way as to be able to receive connection, from the −Y-directional side, of the corresponding one of the plurality of liquid containers 100.

Figure 4:
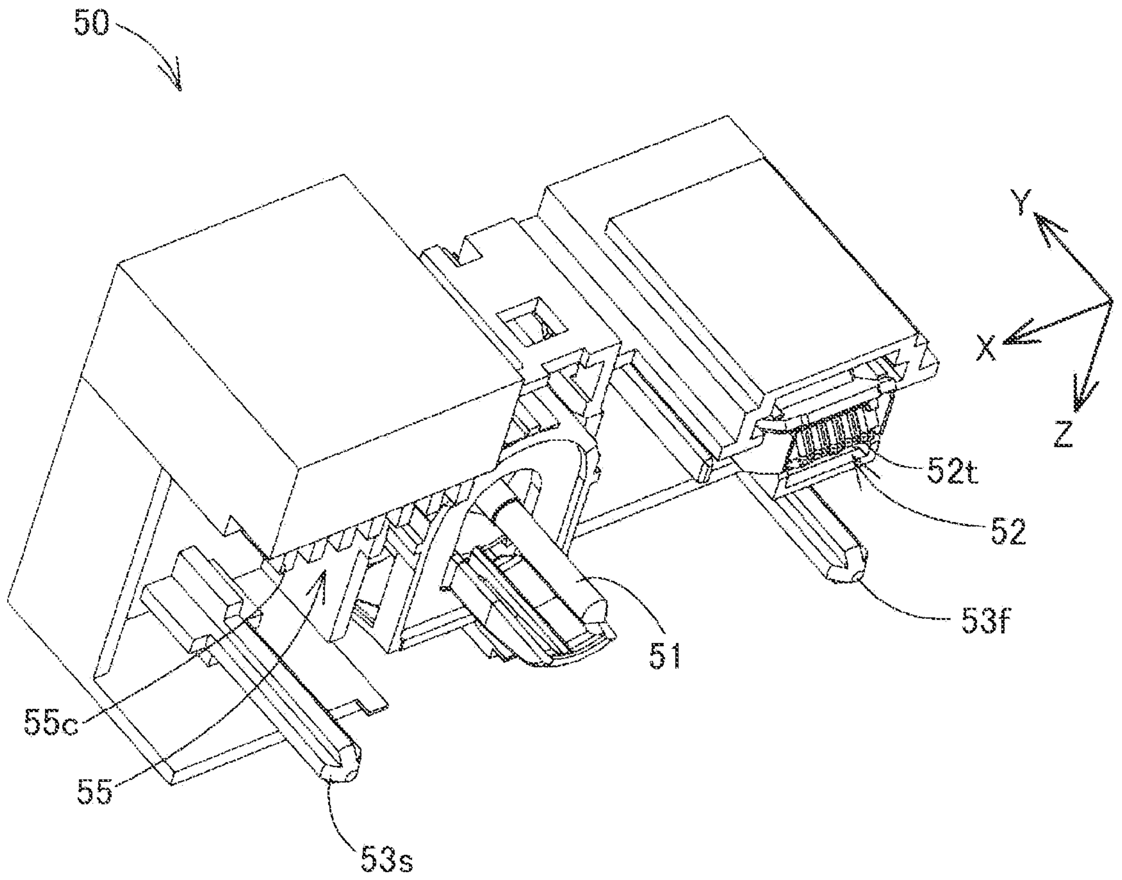
FIG. 4 is a schematic view illustrating the structure of a connection receiver.

As illustrated in FIG. 4, each connection receiver 50 is configured as an integrated one part that includes a liquid inlet portion 51, an apparatus-side electric connection portion 52, a first positioning portion 53*f*, a second positioning portion 53*s*, and a mating structure portion 55. The liquid inlet portion 51 is a flow passage through which liquid coming from the liquid container 100 flows in. The apparatus-side electric connection portion 52 is a connector configured to be electrically connected to the liquid container 100. The apparatus-side electric connection portion 52 has a plurality of terminals 52*t*. Each of the plurality of terminals 52*t* protrudes from the surface of the apparatus-side electric connection portion 52 and is electrically connected to a container-side electric connection portion 140 of the liquid container 100 by contact therewith. Each of the plurality of terminals 52*t* is urged in a protruding direction by an elastic member such as a leaf spring.

The apparatus-side electric connection portion 52 connected to the control unit 20 via wires. Via the electric connection between the apparatus-side electric connection portion 52 and the container-side electric connection portion 140 (FIG. 5B), the control unit 20 sends to, and receives from, the liquid container 100 electric signals. By this signal interaction, the control unit 20 acquires information about the liquid contained in the liquid container 100. The information about the liquid includes, for example, parameters indicating ink color, ink type, the amount of the liquid contained in the liquid container 100, etc. The control unit 20 electrically detects the connection state of the liquid container 100.

The first positioning portion 53*f* and the second positioning portion 53*s* are configured as shaft-like members extending in the −Y direction and are arranged in parallel with the liquid inlet portion 51 provided therebetween. The first positioning portion 53*f* and the second positioning portion 53*s* have a function of determining the arrangement position of the liquid container 100 in the direction along the X axis and the arrangement angle thereof in the horizontal direction during the attachment of the liquid container 100.

The mating structure portion 55 is provided on the +X-directional side with respect to the liquid inlet portion 51. The mating structure portion 55 is located over the second positioning portion 53*s*. The mating structure portion 55 has a concave-convex structure including an array of substantially rectangular projections 55*c* that are erect to have equal height in the +Z direction and extend in the −Y direction next to one another. The array pattern of the projections 55*c* in the concave-convex structure of the mating structure portion 55 differs from one connection receiver 50 to another. On the corresponding one of the plurality of liquid containers 100 for each of the plurality of connection receivers 50, a mating structure receiving portion 155 (FIG. 5B) that has a concave-convex structure that corresponds to the array pattern of the concave-convex structure of the counterpart and can be brought into mating engagement therewith is provided. This prevents the user from erroneously coupling a wrong non-corresponding liquid container 100 to the connection receiver 50.

The fluctuating pressure generation unit 45 is a source that generates pressure fluctuations for sucking or sending liquid. For example, the fluctuating pressure generation unit 45 is a pump. The pressure transmission tube 46 is connected to the fluctuating pressure generation unit 45. The pressure fluctuations generated by the fluctuating pressure generation unit 45 are transmitted through the pressure transmission tube 46. The pressure transmission tube 46 is connected to a pressure chamber (not illustrated) provided inside each connection receiver 50. The fluctuating pressure generation unit 45 raises and lowers pressure inside the pressure chamber repeatedly. By the repetitive pressure rises and falls, in the liquid supplying unit 40, the supplying of liquid to the ejection execution unit 30 is realized.

In the printer 10 according to the present embodiment, the case accommodating portion 60 is provided at the lowest tier. A plurality of cases 61 is housed in the case accommodating portion 60. When the plurality of cases 61 is housed in the case accommodating portion 60, these cases 61 are arranged in a line in the direction along the X axis in the case accommodating portion 60. A liquid container 100 can be encased in each of the plurality of cases 61.

On the +Y-directional side with respect to the layout area LA of each of the plurality of liquid containers 100, the corresponding one of the plurality of connection receivers 50 is provided. As described earlier, in the present embodiment, ink whose color is different from the other colors of ink is contained in each of the plurality of liquid containers 100. The combination of colors of ink contained in the plurality of liquid containers 100 respectively is not specifically limited. For example, cyan ink, magenta ink, yellow ink, and black ink are contained in the plurality of liquid containers 100 respectively.

The case 61 can be attached to and detached from the printer 10 by being moved in the direction along the Y axis in the case accommodating portion 60. The case 61 can be set into the case accommodating portion 60, even without a liquid containing portion 110.

Figure 5A:
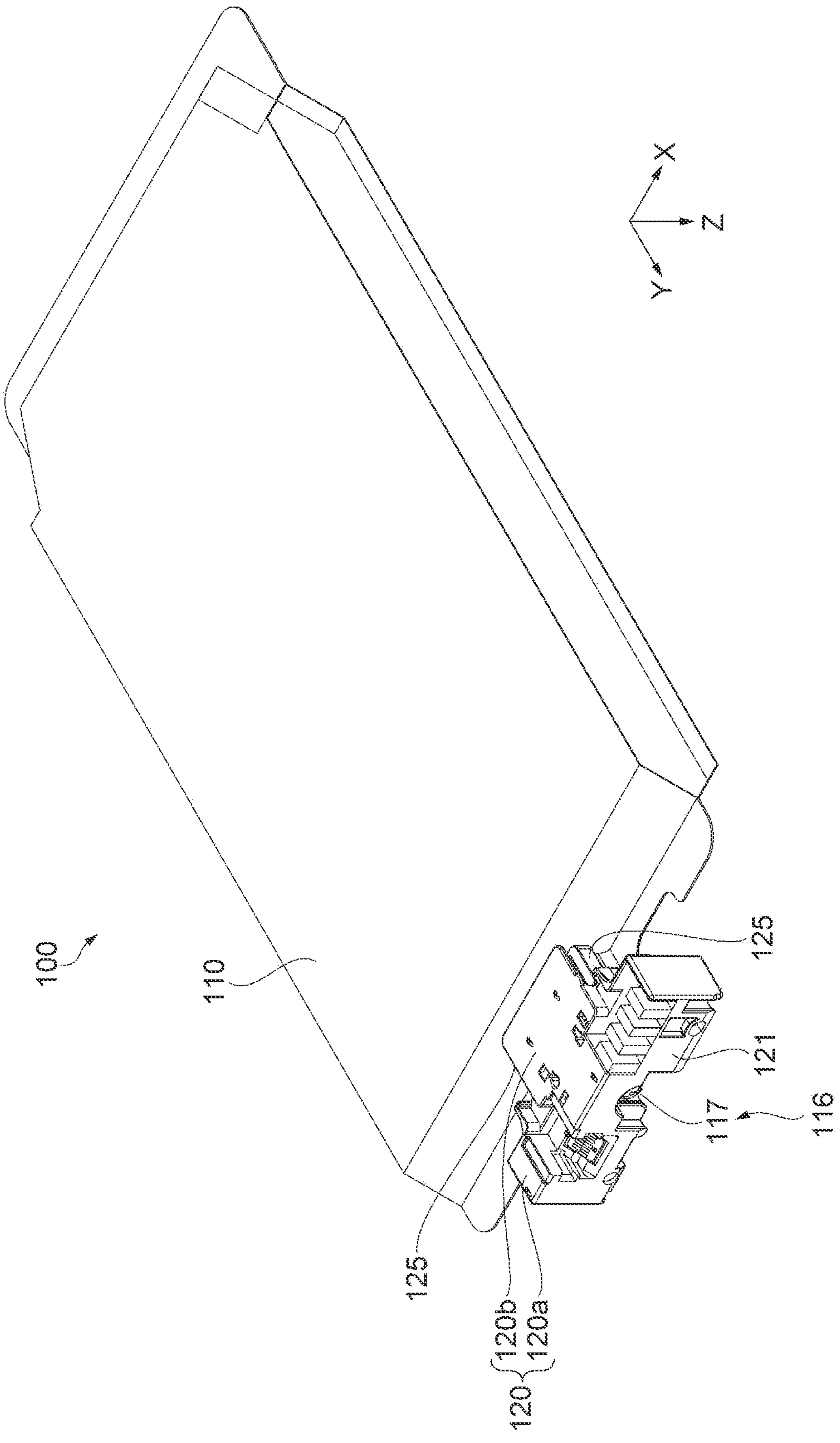
FIG. 5A is a perspective view illustrating the structure of a liquid container.

Next, the structure of the liquid container 100 will now be explained. As illustrated in FIG. 5A, the liquid container 100 is an ink pack and includes the liquid containing portion 110, a supplying passage member 116, and an adapter 120. The liquid container 100 has a substantially rectangular contour shape whose longer sides extend in the direction along the Y axis when viewed in the +Z direction. The adapter 120 is a +Y-side end portion of the liquid container 100. The liquid containing portion 110 is located on the −Y-directional side with respect to the adapter 120. The liquid containing portion 110 has a flat low-profile shape.

The liquid containing portion 110 is a container configured to contain liquid inside. The liquid containing portion 110 has flexibility. The liquid containing portion 110 has a substantially rectangular shape whose longer sides extend in the direction along the Y axis when viewed in the +Z direction. The liquid containing portion 110 is formed by laying one of two sheet members on the other and then welding them together at their peripheral edge portion.

The liquid containing portion 110 is made of a material that has flexibility, gas barrier properties, and liquid non-permeable properties. For example, the liquid containing portion 110 is made of a film member such as polyethylene terephthalate (PET), nylon, polyethylene, or the like.

The supplying passage member 116 is connected to the +Y-side end of the liquid containing portion 110. The supplying passage member 116 has a supplying passage 117, through which the liquid contained in the liquid containing portion 110 is supplied toward the body (the connection receiver 50) of the printer 10. The supplying passage member 116 is made of resin such as polypropylene.

Figure 5B:
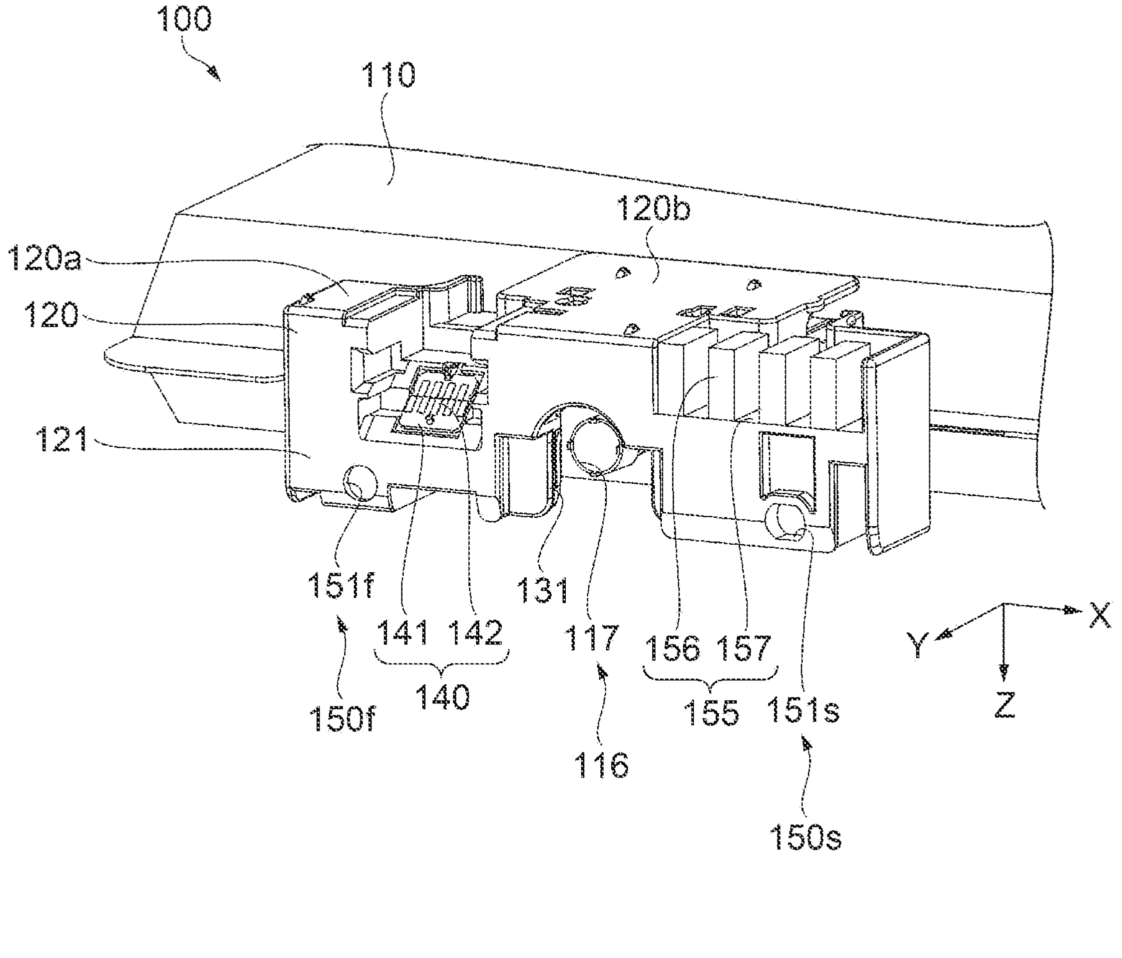
FIG. 5B is a partially enlarged view illustrating the structure of the liquid container.

As illustrated in FIG. 5B, the adapter 120 is mounted on the supplying passage member 116. The adapter 120 is a member for coupling the supplying passage 117 to the body (the connection receiver 50) of the printer 10.

The adapter 120 is a block-like shape. The adapter 120 is, for example, integrally molded using resin such as polypropylene. The adapter 120 has a first block portion 120*a* and a second block portion 120*b*. The first block portion 120*a* is a portion protruding in the +Y direction from the +Y-side end of the liquid containing portion 110. The second block portion 120*b* is a portion protruding in the −Y direction from the +Y-side end of the liquid containing portion 110.

A first face portion 121 is formed on the +Y-side end of the first block portion 120*a* of the adapter 120. The first face portion 121 is oriented in the +Y direction. The face of the first face portion 121 is the leading end face in the direction in which the liquid container 100 is attached. Components for coupling to the connection receiver 50 are provided on the first face portion 121 of the adapter 120. Examples of the first face portion 121 include a flat surface, a curved surface, a concave portion, a convex portion, a step, a groove, a bent portion, a sloped surface, and the like.

As the components for coupling to the connection receiver 50, a liquid outlet 131, a container-side electric connection portion 140, a first receiving portion 150*f*, a second receiving portion 150*s*, and a mating structure receiving portion 155 are provided on the first face portion 121.

The liquid outlet 131 is an opening that is open in the +Y direction. That is, the central axis of the liquid outlet 131 is parallel to the direction along the Y axis. The liquid inlet portion 51 of the connection receiver 50 is inserted into the liquid outlet 131.

The liquid outlet 131 is in communication with the inside of the liquid containing portion 110 through the supplying passage 117 of the supplying passage member 116.

The container-side electric connection portion 140 includes a board portion 141 for connection to the apparatus-side electric connection portion 52. The board portion 141 is disposed in the recess of the first face portion 121. This structure makes it possible to, for example, prevent the user from accidentally touching the board portion 141 and prevent the board portion 141 from being damaged when the liquid containing portion 110 is dropped carelessly. The container-side electric connection portion 140 is configured to be electrically in contact with the apparatus-side electric connection portion 52 of the connection receiver 50. A plurality of terminals 142 is provided on the surface of the board portion 141. The plurality of terminals 142 is disposed at a position corresponding to the plurality of terminals 52*t* of the apparatus-side electric connection portion 52. A memory for storing information about the liquid, a circuit for detecting the connection of the apparatus-side electric connection portion 52, and the like (not illustrated) are provided on the back, which is the opposite of the surface, of the board portion 141.

Each of the first receiving portion 150*f* and the second receiving portion 150*s* is formed as a hole portion extending in the −Y direction. The first receiving portion 150*f* has a first opening 151*f*. The second receiving portion 150*s* has a second opening 151*s*. The first opening 151*f* of the first receiving portion 150*f* accepts the insertion of the first positioning portion 53*f*, which corresponds to it, from the +Y-directional side. The second opening 151*s* of the second receiving portion 150*s* accepts the insertion of the second positioning portion 53*s*, which corresponds to it, from the +Y-directional side. Because of this structure, the attachment position of the liquid container 100 is determined properly.

In the present embodiment, the liquid outlet 131 is interposed between the first receiving portion 150*f* and the second receiving portion 150*s*, which constitute a pair, in the direction along the X axis with a shift in the direction along the Z axis. In the process of attachment of the liquid container 100 to the printer 10, this structure ensures that the liquid outlet 131 will be positioned with high precision with respect to the liquid inlet portion 51 in the direction along the X axis.

The mating structure receiving portion 155 is provided on the +X-directional side with respect to the liquid outlet 131. The mating structure receiving portion 155 has a concave-convex structure including an array of substantially rectangular projections 156 that are erect to have equal height in the −Z direction and extend in the −Y direction next to one another. The mating structure receiving portion 155 has valleys 157 formed between the projections 156 thereof respectively. In terms of concave-and-convex polarity, the array pattern formed by the projections 156 and the valleys 157 in the direction along the X axis is, for example, the opposite of the array pattern of the concave-convex structure of the mating structure portion 55, to which connection is to be made by mating engagement.

When the user moves the liquid container 100 and connects it to the connection receiver 50 that is the matching one corresponding to it, the concave-convex structure of the mating structure portion 55 and the concave-convex structure of the mating structure receiving portion 155 are allowed to come into mating engagement with each other. If the combination of the liquid container 100 and the connection receiver 50 is wrong, the concave-convex structure of the mating structure portion 55 and the concave-convex structure of the mating structure receiving portion 155 do not match and therefore fail to come into mating engagement with each other. This prevents the user from erroneously coupling a wrong non-corresponding liquid container 100 to the connection receiver 50.

Figure 5C:
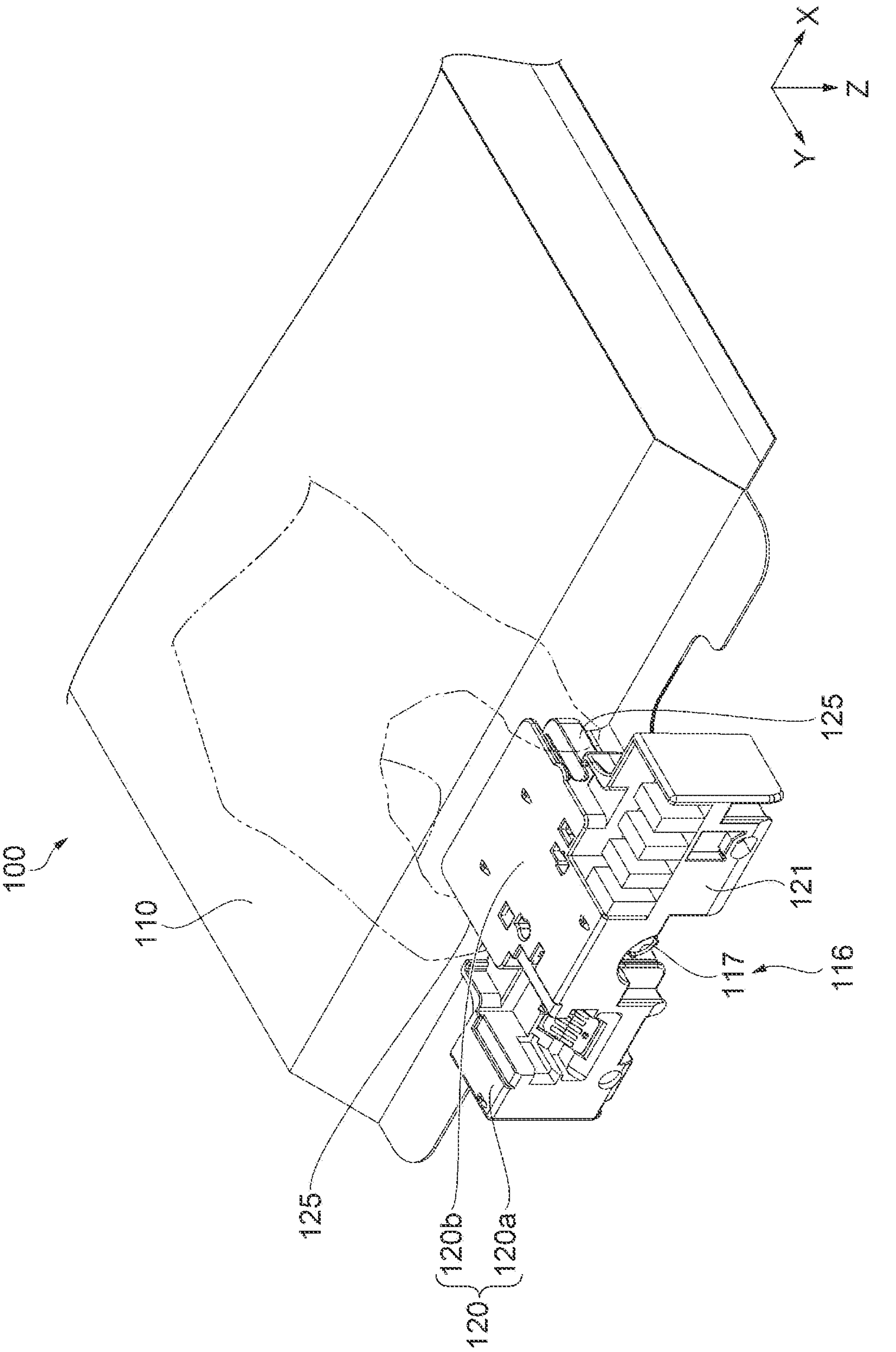
FIG. 5C is a partially enlarged view illustrating the structure of the liquid container.

As illustrated in FIG. 5C, the second block portion 120*b* has a protruding portion 125 protruding in the −Z direction from the upper surface of the liquid containing portion 110 on the +Y-side end of the liquid containing portion 110. The protruding portion 125 is provided on the +X-side end and the −X-side end of the second block portion 120*b*. The protruding portion 125 is a portion that can be gripped with the user's fingers. This structure makes it easier for the user to handle the liquid container 100, for example, when carrying the liquid container 100 and when attaching the liquid container 100 to the case 61 or detaching the liquid container 100 from the case 61.

Figure 5D:
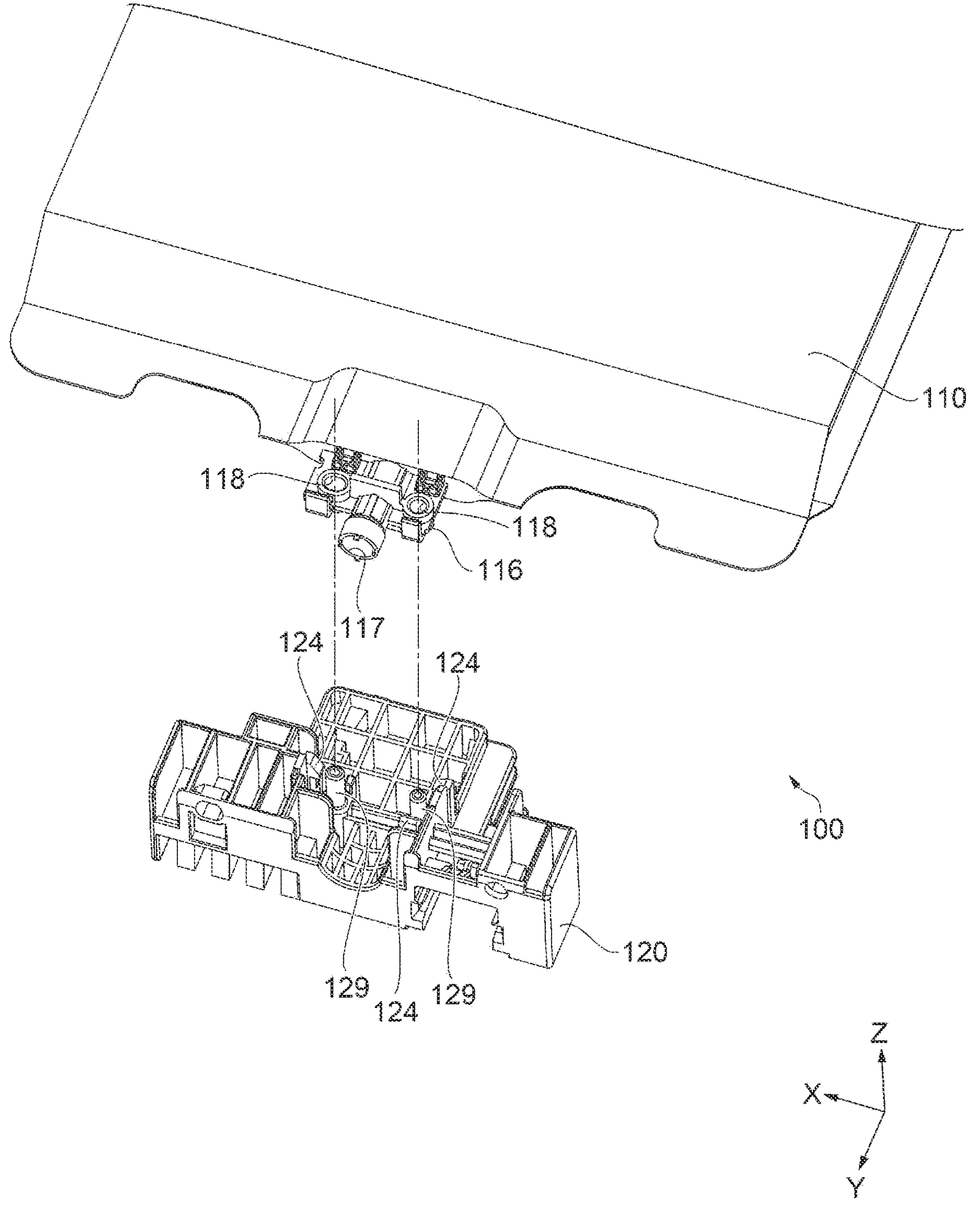
FIG. 5D is an exploded view illustrating the structure of the liquid container.
Figure 5E:
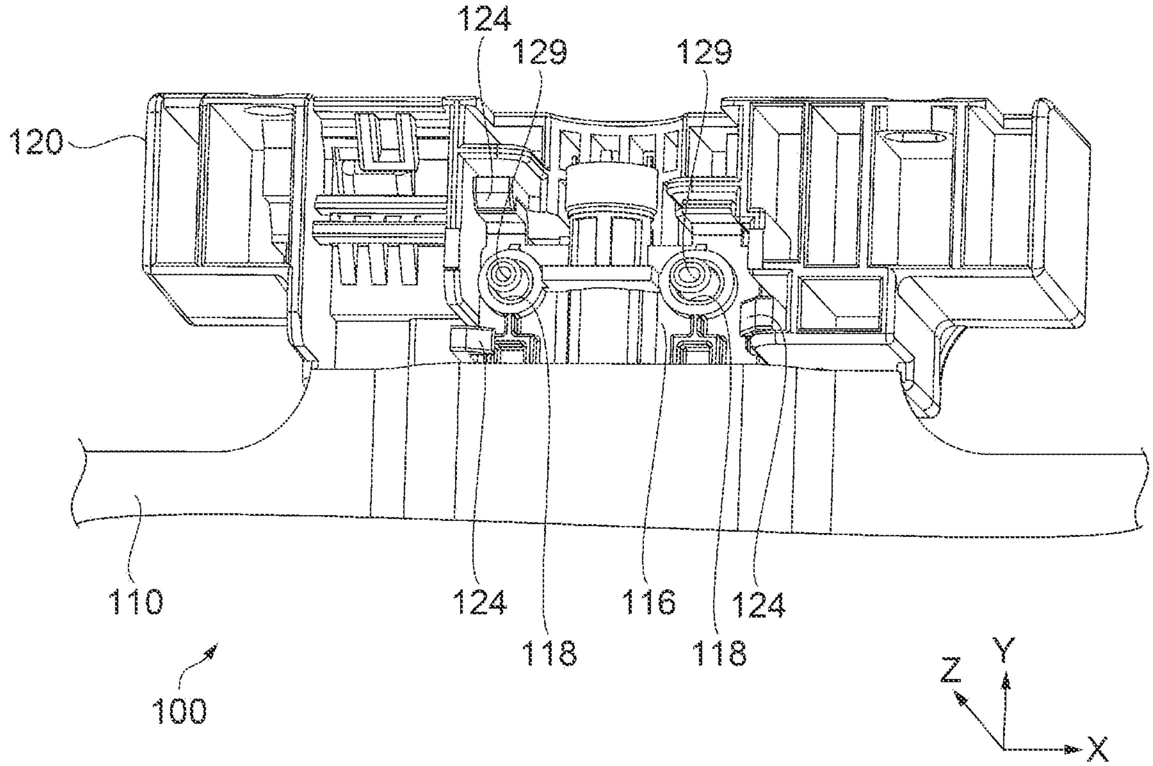
FIG. 5E is a partially enlarged view illustrating the structure of the liquid container.

Next, a joint mechanism for the adapter 120 and the supplying passage member 116 will now be explained. As illustrated in FIGS. 5D and 5E, snap fitting is used as a means for joining the adapter 120 and the supplying passage member 116 together. A snap-fit mechanism is a mechanical interlock joint structure. This mechanism fixes parts together by means of fitting engagement utilizing the elasticity of the material thereof. The adapter 120 and the supplying passage member 116 according to the present embodiment are made of resin such as, for example, polypropylene. The adapter 120 and the supplying passage member 116 are mechanically joined by utilizing the elasticity of this kind of material.

Specifically, the adapter 120 has a hook portion 124 made up of a plurality of hooks constituting the snap-fit mechanism. The hook portion 124 is a nail portion for elastic engagement with the supplying passage member 116. The hook portion 124 is configured to be joined to the −Z-side face of the supplying passage member 116. The hook portion 124 is located at three positions, namely, one at a position corresponding to the +X-side end of the supplying passage member 116, one at a position corresponding to the −X-side end thereof, and one at a position corresponding to the +Y-side end thereof. The supplying passage member 116 has positioning holes 118 going through the supplying passage member 116 in the direction along the Z axis. Two positioning holes 118 are disposed along the X axis. The adapter 120 has positioning pins 129 projecting in the +Z direction. Two positioning pins 129 are disposed along the X axis. The joint position of the supplying passage member 116 and the adapter 120 is determined by the fitting insertion of the positioning pins 129 into the respective positioning holes 118. Moreover, this makes it possible to set the position of nail engagement by the hook portion 124 properly.

In the process of mechanical connection of the adapter 120 and the supplying passage member 116, the adapter 120 is brought into contact with the supplying passage member 116 while the positioning pins 129 are fitted into the positioning holes 118 respectively. Due to a reactive force exerted from the supplying passage member 116, the hook portion 124 is inserted while giving its way because of its elasticity. Then, when the hook portion 124 reaches the −Z-side face of the supplying passage member 116, the hook portion 124 is released from the reactive force exerted from the supplying passage member 116 and thus returns to its original state. By this means, the hook portion 124 fits into place into the supplying passage member 116, and the adapter 120 and the supplying passage member 116 are joined together. In the present embodiment, since the hook portion 124 is provided at three positions, the adapter 120 and the supplying passage member 116 can be joined together securely.

Using snap fitting makes it possible to join the adapter 120 and the supplying passage member 116 together easily. This makes it possible to reduce the material of the adapter 120. For example, in comparison with a conventional adapter structure in which the supplying passage member 116 is fixed by being clamped between two parts, one from above and the other from below, it is possible to significantly reduce the material of the adapter 120. This makes it possible to reduce burdens on the environment.

The adapter 120 is an integrally-molded part. In comparison with an adapter made up of a plurality of members, this structure makes it possible to reduce cost. Moreover, this structure is environmentally friendly.

Moreover, since snap fitting is used, in the process of detachment of the supplying passage member 116 from the adapter 120, the hook portion 124 elastically gives its way toward the outside of the supplying passage member 116; this elastic yielding disengages the hook portion 124 from the supplying passage member 116, thereby disconnecting the supplying passage member 116 from the adapter 120. Since this structure makes it easier to perform detachment, the efficiency of detachment after the end of use of the liquid container 100 increases.

Although the hook portion 124 is provided on the adapter 120 in the present embodiment, the scope of the present disclosure is not limited to this example. For example, the hook portion may be provided on the supplying passage member 116. Even if modified so, it is possible to obtain the same effects as those described above.

Figure 6A:
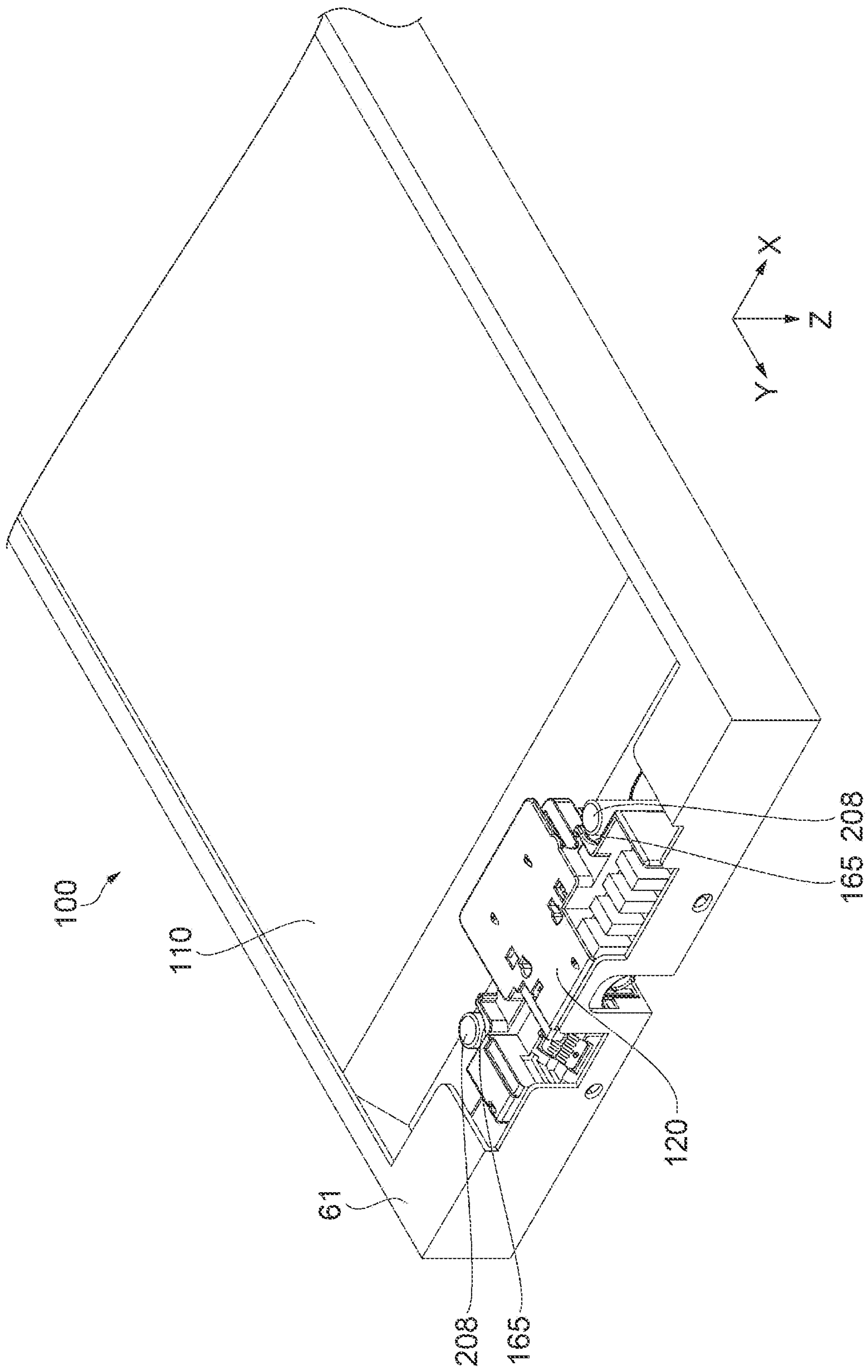
FIG. 6A is a perspective view illustrating the structure of a liquid container.
Figure 6B:
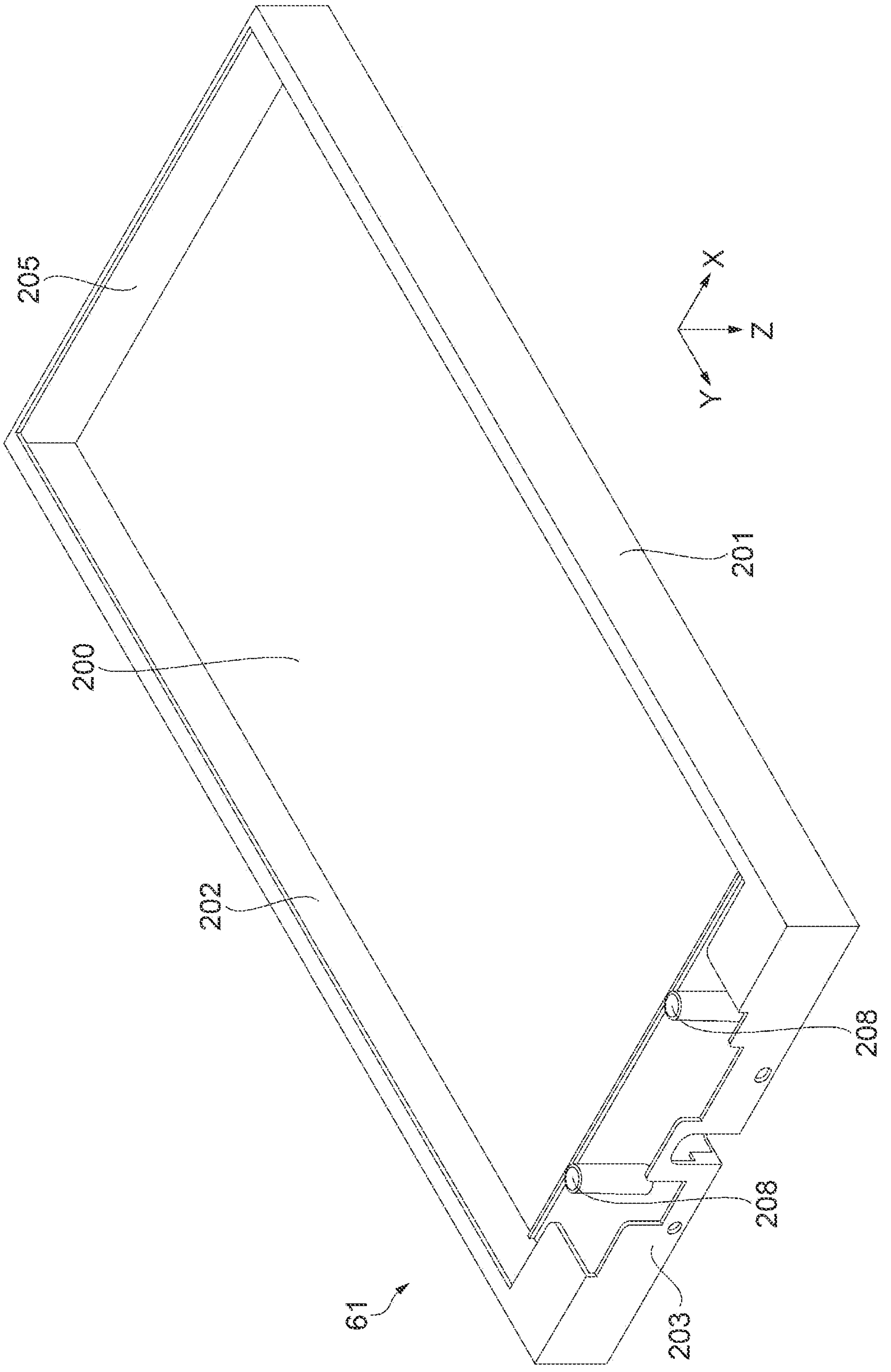
FIG. 6B is a perspective view illustrating the structure of a case.

Next, the structure of the liquid container 100 with the case 61 will now be explained. As illustrated in FIGS. 6A and 6B, the case 61 has a shape of substantially rectangular parallelepiped whose longer sides extend in the direction along the Y axis. The case 61 is an open-topped box with a bottom, the opening of which is on the −Z-directional side. The case 61 is made of resin such as, for example, polypropylene.

The case 61 has a bottom wall portion 200, a first side wall portion 201, a second side wall portion 202, a rear wall portion 203, and a front wall portion 205. The bottom wall portion 200 is a wall portion having a substantially rectangular shape and serving as the bottom of the case 61. The liquid container 100 is disposed on the bottom wall portion 200. The bottom wall portion 200 has a size that is large enough so that at least the entirety of the liquid containing portion 110 can be accommodated when the liquid container 100 is disposed.

The height of each of the first side wall portion 201 and the second side wall portion 202 is approximately the same as the height of the adapter 120 of the liquid container 100.

Figure 6C:
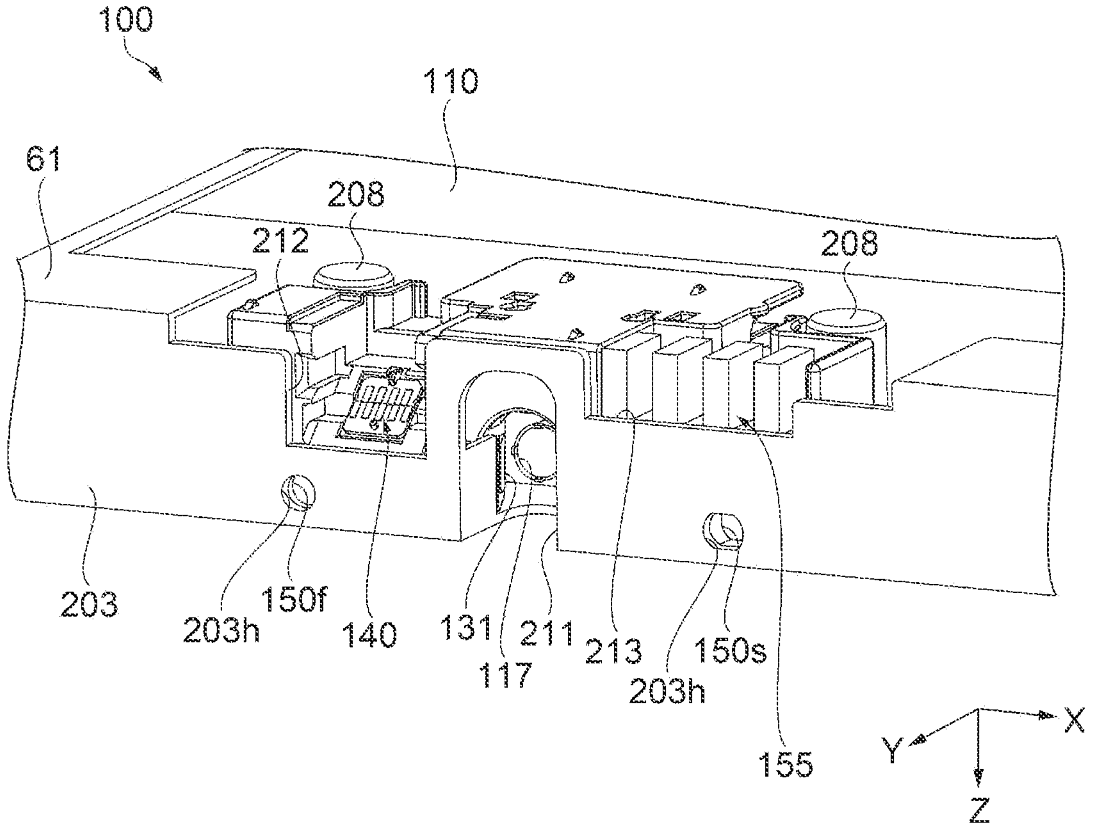
FIG. 6C is a partially enlarged view illustrating the structure of the liquid container.

As illustrated in FIG. 6C, a first cutout portion 211 is formed at a position corresponding to the liquid outlet 131. A second cutout portion 212 is formed at a position corresponding to the container-side electric connection portion 140. A third cutout portion 213 is formed at a position corresponding to the mating structure receiving portion 155. In addition, a through hole 203*h* for accepting the insertion of the first positioning portion 53*f* is formed at a position corresponding to the first receiving portion 150*f*, and another through hole 203*h* for accepting the insertion of the second positioning portion 53*s* is formed at a position corresponding to the second receiving portion 150*s*. Therefore, in the liquid container 100 with the case 61, when the liquid container 100 is viewed in the −Y direction, the liquid outlet 131, the container-side electric connection portion 140, the mating structure receiving portion 155, the first receiving portion 150*f*, and the second receiving portion 150*s* are visible from the outside. Therefore, the liquid container 100 with the case 61 can be coupled to the connection receiver 50.

The bottom wall portion 200 has a guiding portion 208, specifically, two guides, protruding in the −Z direction. The guiding portion 208 according to the present embodiment has a columnar shape. The adapter 120 has a guided portion 165, specifically, two guided members. One of the two guided members 165 is provided on the +X-side end of the adapter 120. The other is provided on the −X-side end of the adapter 120. The guided portion 165 is a groove portion having a curved surface. In the process of placement of the liquid container 100 into the case 61, each of the two guided members 165 is guided by the corresponding one of the two guides 208 of the case 61, and, because of this guiding, the positioning of the liquid container 100 with respect to the case 61 is performed. In a state in which the liquid container 100 has been placed into the case 61, the adapter 120 is fixed to the case 61, with the guiding portion 208 fitted on the guided portion 165. This structure ensures the positioning of the liquid container 100 on the case 61 and suppresses a positional deviation such as rotation in a direction along the horizontal direction of the liquid container 100. When placing the liquid container 100 into the case 61, the user puts the user's fingers on the protruding portion 125 of the adapter 120; this makes it possible to place the liquid container 100 into the case 61 easily.

The liquid container 100 is attached, to the printer 10, in a state of being placed in the case 61. That is, the liquid container 100 is attached, to the case accommodating portion 60 of the printer 10, in a state of being placed in the case 61. The liquid container 100 is detached, from the printer 10, in a state of being placed in the case 61. The liquid container 100 with the case 61 having the structure described above can be attached to and detached from the connection receiver 50 easily. Moreover, the structure having the case 61 makes it easier to give shaking movement to the liquid containing portion 110 and therefore makes it possible to stir the liquid contained in the liquid containing portion 110 easily.

Figure 7A:
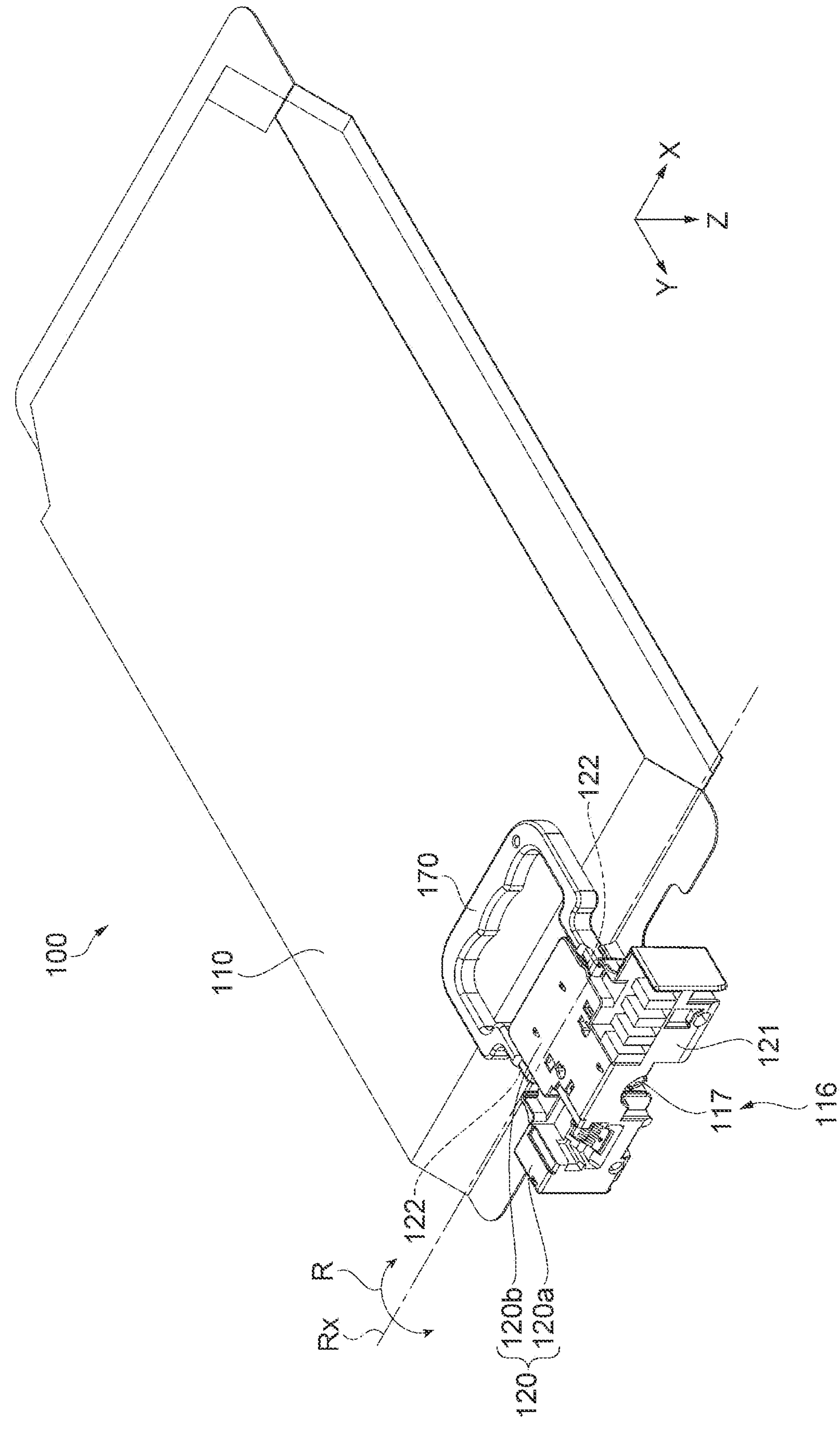
FIG. 7A is a perspective view illustrating the structure of a liquid container.
Figure 7B:
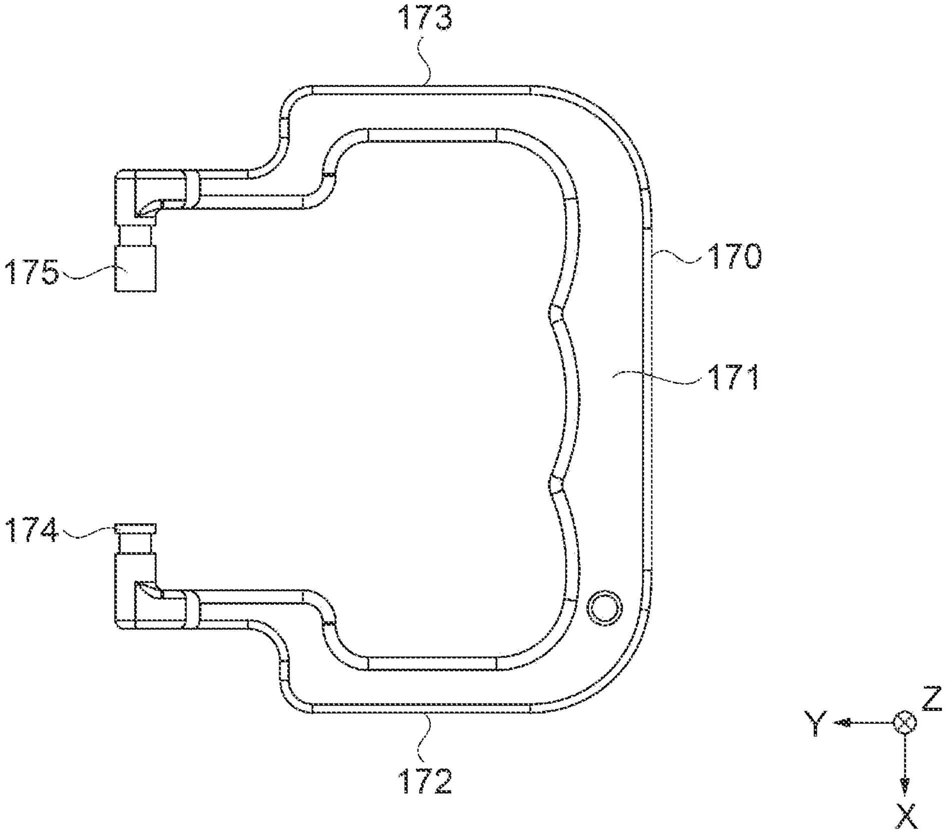
FIG. 7B is a plan view illustrating the structure of a handle portion.

The liquid container 100 according to the present embodiment is configured such that a handle portion 170, which can be gripped, can be detachably attached to it. As illustrated in FIGS. 7A and 7B, the handle portion 170 is attached to the adapter 120. The handle portion 170 is a portion that the user is able to grip when, for example, moving the liquid container 100. In the present embodiment, the handle portion 170 is molded using resin such as polypropylene. The handle portion 170 includes a grip portion 171, a first connecting portion 172, a second connecting portion 173, a first base end portion 174, and a second base end portion 175. The grip portion 171 is a portion to be gripped with fingers by the user.

The first connecting portion 172 and the second connecting portion 173 extend from the respective two ends of the grip portion 171 in a direction intersecting with the direction along the X axis. The first connecting portion 172 connects the +X-side end of the grip portion 171 to the first base end portion 174. The second connecting portion 173 connects the −X-side end of the grip portion 171 to the second base end portion 175. Each of the first base end portion 174 and the second base end portion 175 is a short-shaft-like portion having a substantially columnar shape. The first base end portion 174 and the second base end portion 175 protrude in such a way as to face each other in the direction along the X axis. The first base end portion 174 protrudes in the −X direction from the end of the first connecting portion 172. The second base end portion 175 protrudes in the +X direction from the end of the second connecting portion 173.

Figure 7C:
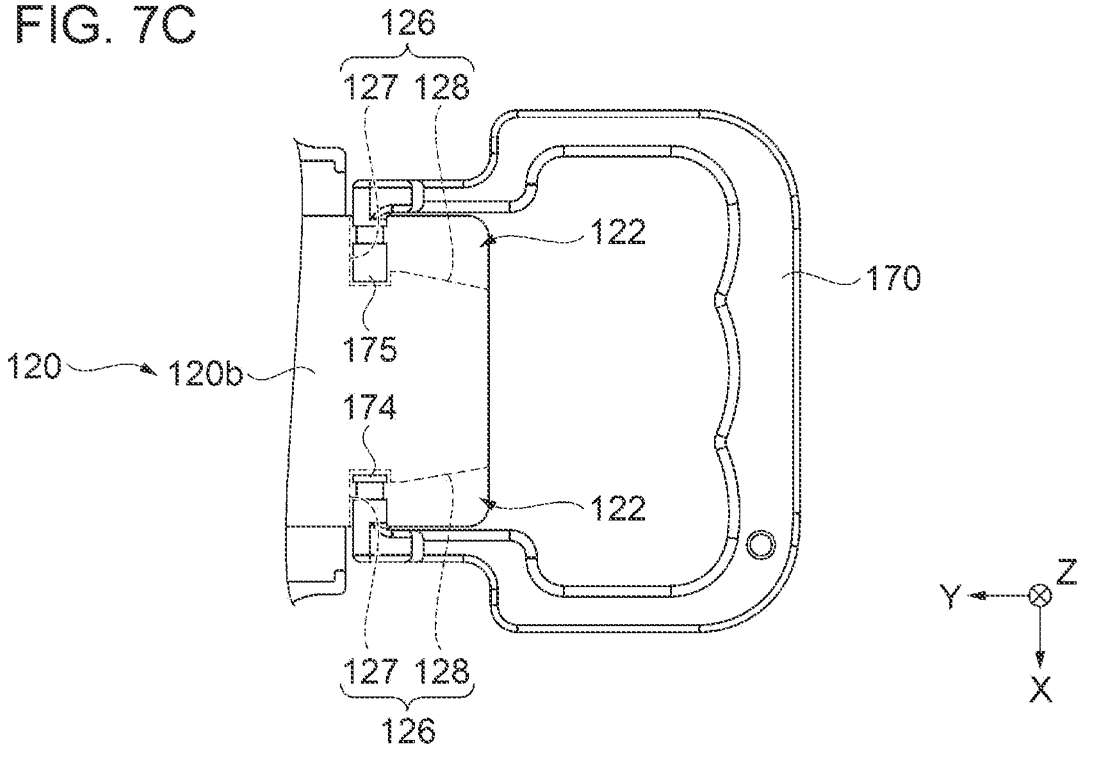
FIG. 7C is a plan view illustrating the structure of an adapter.

As illustrated in FIG. 7C, the adapter 120 has an attachment portion 126 configured such that the handle portion 170 can be attached and detached. The attachment portion 126 is formed in a groove portion 122 formed in the second block portion 120*b*. The groove portion 122 is provided in the +X-side end and the −X-side end of the second block portion 120*b*. The attachment portion 126 includes a base-end-portion accommodating portion 127, which is able to accommodate the first base end portion 174 and the second base end portion 175, and a guiding surface portion 128 for guiding the first base end portion 174 and the second base end portion 175 in the process of attachment and detachment of the handle portion 170.

Each of the first base end portion 174 and the second base end portion 175 is rotatably fitted into the base-end-portion accommodating portion 127 of the adapter 120. The base-end-portion accommodating portion 127 is made up of shaft holes each extending in the direction along the X axis. Each of the first base end portion 174 and the second base end portion 175 is inserted into the corresponding one of the shaft holes along the X axis.

The handle portion 170 rotates with respect to the adapter 120 as indicated by an arrow R in FIG. 7A when operated by the user. The handle portion 170 is able to rotate in a direction going from the liquid containing portion 110 toward the adapter 120 and in a direction going from the adapter 120 toward the liquid containing portion 110. The rotation axis RX, which is the center of rotation of the handle portion 170, is the same as the axial center of each of the first base end portion 174 and the second base end portion 175.

The handle portion 170 is rotatable when the liquid container 100 is in a state of being placed in the case 61. The handle portion 170 is in first positional orientation, which is orientation of having been turned on its side toward the liquid containing portion 110, when the liquid container 100 is in a state of being attached to the printer 10. The handle portion 170 is in second positional orientation, which is orientation of having been turned toward the adapter 120, when, for example, the liquid container 100 is carried.

Figure 7D:
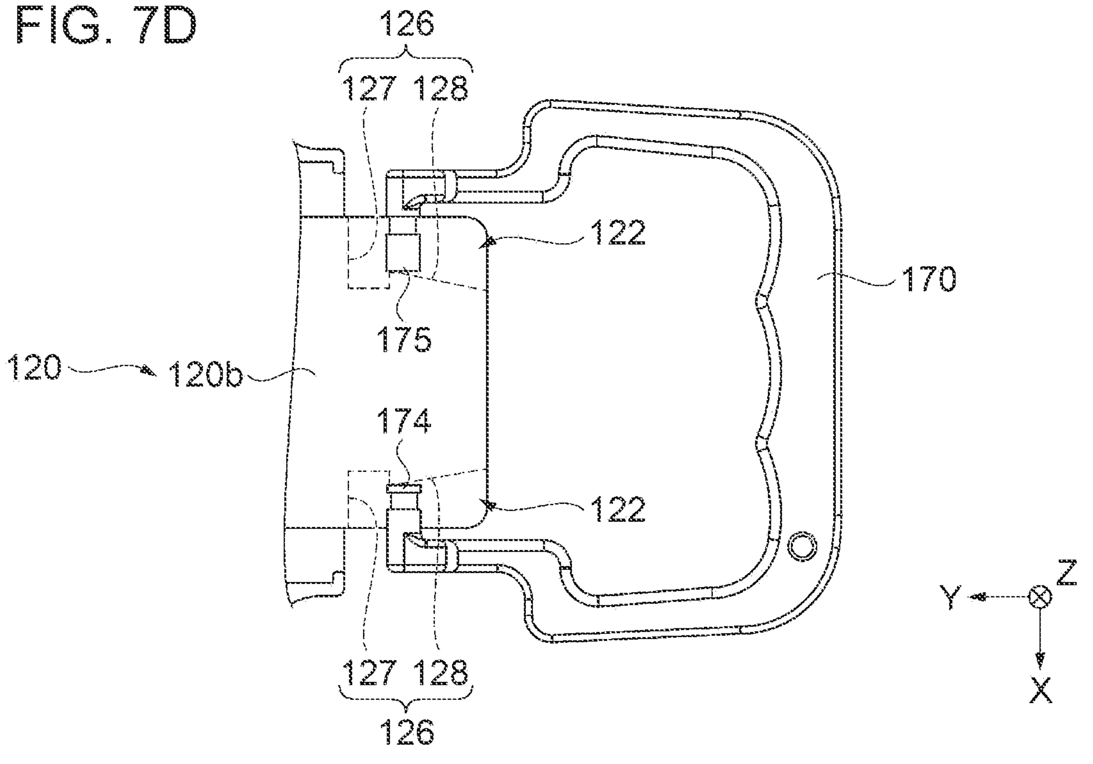
FIG. 7D is a schematic view illustrating how the handle portion is attached and detached.

Next, how to attach the handle portion 170 to the adapter 120, and detach the handle portion 170 from the adapter 120, will now be explained. The elasticity of the handle portion 170 is utilized for attach the handle portion 170 to the adapter 120, and detaching the handle portion 170 from the adapter 120. Specifically, as illustrated in FIG. 7D, as viewed in the +Z direction, each of the guiding surfaces 128 is sloped from the −Y-side end of the second block portion 120*b* toward the corresponding base-end-portion accommodating portion 127. More particularly, the distance between one guiding surface 128 and the other guiding surface 128 in the direction along the X axis becomes greater gradually toward the base-end-portion accommodating portion 127 from the −Y-side end of the second block portion 120*b*. The distance between one guiding surface 128 and the other guiding surface 128 in the direction along the X axis at the −Y-side end of the second block portion 120*b* is approximately the same as the minimum distance between the base-end-portion accommodating portion 127 and the base-end-portion accommodating portion 127. In addition, this distance is approximately the same as the distance between the first base end portion 174 and the second base end portion 175 of the handle portion 170 before the attachment in the direction along the X axis. The distance between one guiding surface 128 and the other guiding surface 128 at the +Y-side end of the second block portion 120*b* is greater than the distance described above.

Therefore, to attach the handle portion 170 to the adapter 120, the user moves the first base end portion 174 and the second base end portion 175 of the handle portion 170 along the sloped contour of the respective guiding surfaces 128 toward the base-end-portion accommodating portion 127; this movement increases the distance between the first base end portion 174 and the second base end portion 175 due to the elasticity of the handle portion 170. Then, when the first base end portion 174 and the second base end portion 175 reach the base-end-portion accommodating portion 127, the distance between the first base end portion 174 and the second base end portion 175 returns to the original distance value due to the resilience of the handle portion 170, and the first base end portion 174 and the second base end portion 175 enter the base-end-portion accommodating portion 127 and are held in place. The handle portion 170 can be attached to the adapter 120 in this way. To detach the handle portion 170 from the adapter 120, the user pulls the first connecting portion 172 and the second connecting portion 173 away from each other. Pulling the first connecting portion 172 and the second connecting portion 173 away from each other increases the distance between the first base end portion 174 and the second base end portion 175 and thus makes it possible to disconnect the first base end portion 174 and the second base end portion 175 from the base-end-portion accommodating portion 127. Then, the user moves the handle portion 170 toward the −Y directional side. The user is able to detach the handle portion 170 from the adapter 120 in this way.

Using the handle portion 170 described above makes it easier for the user to handle the liquid container 100, for example, when carrying the liquid container 100 and when attaching the liquid container 100 to the case 61 or detaching the liquid container 100 from the case 61. Moreover, since the handle portion 170 is configured to be detachable from the adapter 120, for example, it is possible to provide the liquid container 100 without the handle portion 170 to users who do not need the handle portion 170. This makes it possible to reduce the material of the handle portion 170 and reduce burdens on the environment.

What is claimed is:

1. A liquid container configured to be detachably attached to a printer body, the liquid container comprising:

a liquid containing portion for containing liquid;

a supplying passage member having a supplying passage in liquid communication with the liquid containing portion, the liquid contained in the liquid containing portion being supplied toward the printer body through the supplying passage;

an adapter mounted on the supplying passage member and configured to couple the supplying passage to the printer body; and a snap fit mechanism that connects the adapter and the supplying passage member with a mechanically interlocked joint.

2. The liquid container according to claim 1, wherein each of the supplying passage member and the adapter has a positioning structure for determining mutual joint position.

3. The liquid container according to claim 1, wherein the adapter is integrally molded.

4. The liquid container according to claim 1, wherein the adapter has an attachment portion formed such that a handle portion configured to be gripped is to be detachably attached.

5. The liquid container according to claim 1, further comprising:

a case for detachable attachment of the liquid containing portion.

6. The liquid container according to claim 1, wherein the snap fit mechanism comprises a hook on the adapter that is interlocked with the supplying passage member.

7. The liquid container according to claim 1, wherein the snap fit mechanism comprises a plurality of hooks on the adapter that are interlocked with the supplying passage member.

8. The liquid container according to claim 7, wherein the supply passage member comprises holes and the adapter comprises pins, and the pins are configured to engage with the holes and align the hooks with the supply passage member prior to being interlocked.

* * * * *